H. W. SISSON.
ILLUMINATING MECHANISM.
APPLICATION FILED OCT. 26, 1914.

1,149,473.

Patented Aug. 10, 1915.

Inventor
H. W. Sisson

Witnesses
Robert M. Sutphen
A. J. Hind

By Watson E. Coleman
Attorney

UNITED STATES PATENT OFFICE.

HENRY W. SISSON, OF LAKE GEORGE, NEW YORK.

ILLUMINATING MECHANISM.

1,149,473.   Specification of Letters Patent.   Patented Aug. 10, 1915.

Application filed October 26, 1914. Serial No. 868,725.

*To all whom it may concern:*

Be it known that I, HENRY W. SISSON, a citizen of the United States, residing at Lake George, in the county of Warren and State of New York, have invented certain new and useful Improvements in Illuminating Mechanism, of which the following is a specification, reference being had to the accompanying drawings.

This invention relates to certain improvements in illuminating mechanism and has relation more particularly to a mechanism of this general character especially designed and adapted for use in connection with automobiles and the like; and an object of the invention is to provide a novel and improved mechanism of this character whereby a forward side portion of the vehicle may be illuminated whereby an approaching car may be enabled to steer entirely free of the vehicle.

Furthermore, it is an object of the invention to provide a novel and improved mechanism of this character adapted to be operatively supported by the vehicle whereby the rays emitted therefrom will be directed upon a forward front wheel, preferably at the left side of the vehicle, whereby said wheel in substantially its entirety will be visible.

The invention consists in the details of construction and in the combination and arrangement of the several parts of my improved illuminating mechanism whereby certain important advantages are attained and the device is rendered simpler, less expensive and otherwise more convenient and advantageous for use, all as will be hereinafter more fully set forth.

The novel features of the invention will be carefully defined in the appended claims.

In order that my invention may be the better understood, I will now proceed to describe the same with reference to the accompanying drawings, wherein—

Figure 1:
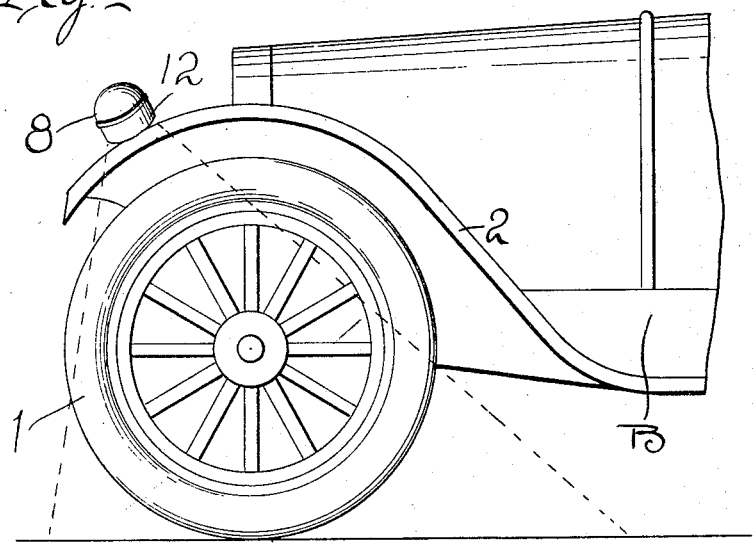
Figure 2:
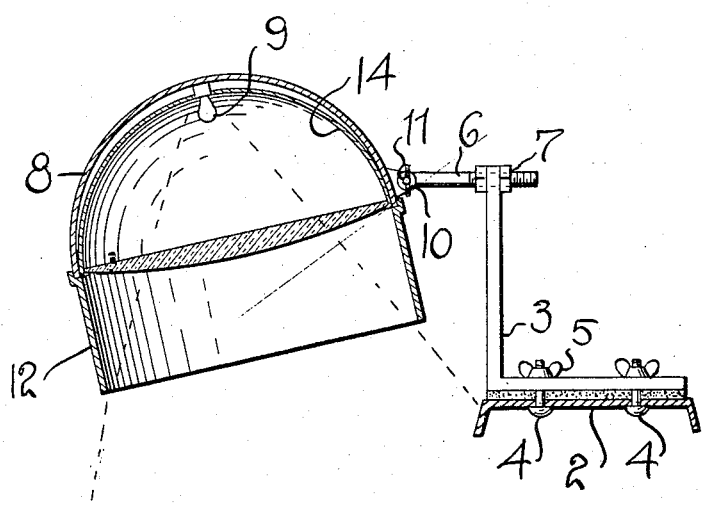

Figure 1 is a fragmentary view in elevation of a vehicle showing an illuminating mechanism constructed in accordance with an embodiment of my invention applied thereto; and Fig. 2 is an enlarged view, partly in section and partly in elevation, illustrating my illuminating mechanism as herein set forth.

As disclosed in the accompanying drawings, 1 denotes a front wheel preferably at the left side of the vehicle such as an automobile or the like and being disposed below a conventional guard 2 carried by the body B of the vehicle. As the particular construction of the wheel and body forms no particular part of my invention, it is not believed that a further detail thereof need be given.

Secured to the guard 2 adjacent the forward extremity thereof is a bracket member 3 substantially L-shape in form and herein disclosed as operatively connected with the guard through the medium of the bolts 4 projected upwardly through the guard and the bracket and having coacting therewith the wing nuts 5 in a manner and for a purpose which is believed to be self-evident.

The bracket 3 is preferably disposed transversely of the guard 2 and is substantially L-shape in form and in the upper free extremity of the bracket is supported the rod 6 capable of longitudinal adjustment relative to the bracket 3 and maintained in its various adjustment through the medium of a conventional lock nut 7 or the like.

Pivotally engaged with the outer extremity of the rod 6 through the medium of the substantially horizontally disposed pivotal pin 10 is the parti-spherical hood or casing 8 in which is positioned an illuminating member 9, herein disclosed as a conventional incandescent electric lamp.

Coacting with the pivotal pin is a wing nut 11 whereby the hood or casing 8 may be maintained in its varying adjustments.

The rod 6, as is believed to be clearly shown in the accompanying drawings, is disposed laterally of the body B or more particularly the guard 2 to which the bracket 3 is engaged and is of such a length as to position the hood or casing 8 entirely to one side of the guard whereby the same may be so adjusted around the pivotal pin 10 as to direct the rays emitted from the illuminating member 9 upon the wheel 1 whereby said wheel is substantially entirely illuminated and the occupant of an approaching car may readily discern the same and thereby avoid striking the wheel as often occurs with disastrous results.

I have found in practice that with the car having applied thereto an illuminating mechanism constructed in accordance with an embodiment of my invention, the wheel 1 and also the hub cap thereof may be readily seen, irrespective of the glare of an approaching car or of the illumination afforded by the headlight proper of the car to which the mechanism is attached. The advantage of this device will, it is thought, be clearly obvious to the drivers of motor driven vehicles.

I also find it of advantage to employ in connection with the hood or casing 8, the shade 12 depending therefrom and whereby the rays emitted from the illuminating member 9 do not reflect upon the driver of the car. I also find it of advantage to place within the hood or casing 8 the reflector 14, for a purpose which is believed to be clearly apparent.

While I have hereinbefore stated that the illuminating mechanism, herein embodied, is focused upon the side of the wheel, it is also to be observed that the rays of the illuminating mechanism shine on the front portion of the tire.

From the foregoing description, it is thought to be obvious that an illuminating mechanism constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. The combination with a body, a supporting wheel therefor and a guard for the wheel, of a bracket secured to the guard and disposed transversely thereof, said bracket being positioned in advance of the axial center of the supporting wheel, a rod secured to the bracket and capable of endwise adjustment and extending outwardly beyond the wheel, an illuminating member carried by the outer extremity of the rod and capable of swinging adjustment in substantially a vertical plane to direct the rays of the illuminating member inwardly upon the outer side of the wheel.

2. The combination with a body, a supporting wheel therefor and a guard for the wheel, of a bracket secured to the guard and disposed transversely of the guard, a rod secured to the bracket and capable of endwise adjustment and normally extending outwardly beyond the wheel, an illuminating member carried by the outer extremity of the rod and capable of swinging adjustment in substantially a vertical plane to direct the rays of the illuminating member inwardly upon the outer side of the wheel.

3. The combination with a body, a supporting wheel therefor, of an illuminating member carried by the body in advance of the axial center of the supporting wheel and beyond the outer face of said supporting wheel, said illuminating member being adjustable about a horizontal axis to direct the rays of the illuminating member inwardly upon the outer side of the wheel.

In testimony whereof I hereunto affix my signature in the presence of two witnesses.

HENRY W. SISSON.

Witnesses:
  E. C. SISSON,
  S. F. HAWLEY.